INVENTOR
Marcel Cassé
By Robert E. Burns
ATTORNEY

Patented Oct. 28, 1952

2,615,208

UNITED STATES PATENT OFFICE 2,615,208

AUTOMATIC FORMING MACHINE FOR THE MANUFACTURE OF FELT HATS, MUFFS, AND LIKE FELT ARTICLES

Marcel Cassé, Essonnes, France

Application August 6, 1948, Serial No. 42,794
In France December 16, 1947

9 Claims. (Cl. 19—148)

It is known that for making the "hood" of felt hats and muffs, the "forming" is done in machines called "forming machines" in which a strong current of air draws the fur on to a perforated former (perforated cone or cylinder) inside a chamber of the forming machine. The layer of fur which coats this perforated former is sprayed with hot water inside the chamber.

The operator attending to the machine generally works with two perforated formers which he successively removes and replaces inside the chamber and which he turns over in order to make the formed hood fall off. This is a difficult operation which sometimes exceeds the physical capabilities of one man when the perforated former becomes too large and too heavy. Now large sizes are necessary, particularly in the case of the manufacture of felt muffs which have to be formed of large enough size to acquire the desired final dimensions after a suitable hardening operation. In the same case of muffs, it is advantageous to arrange the perforated cylinder horizontally in order to obtain a suitable composition.

Finally, there is a well known drawback in spraying the hoods inside the chamber or tank. The jets of water wet the inner surface of the tank and fur fibres adhere to this wet surface, the fur which subsequently becomes detached therefrom being the cause of faults in the hats or the muffs.

The present invention has for its object to provide an automatic machine for coating cones, cylinders and like articles with fur fibres, which enables the above mentioned drawbacks to be eliminated.

This result is obtained by the fact that according to the invention, this machine is provided with at least one perforated former adapted to rotate about its axis which is horizontal and supported by a vertical support which is movable in its plane, thereby enabling said former to be moved successively into two positions: the first for forming in a tank, and the second for spraying outside said tank.

Other features and advantages will become apparent from the ensuing description.

In the accompanying drawing, which is given solely by way of example:

Fig. 4 is a diagram of the electric connections relating to the supply of the motor which drives the rotary vertical plate.

Figure 1:
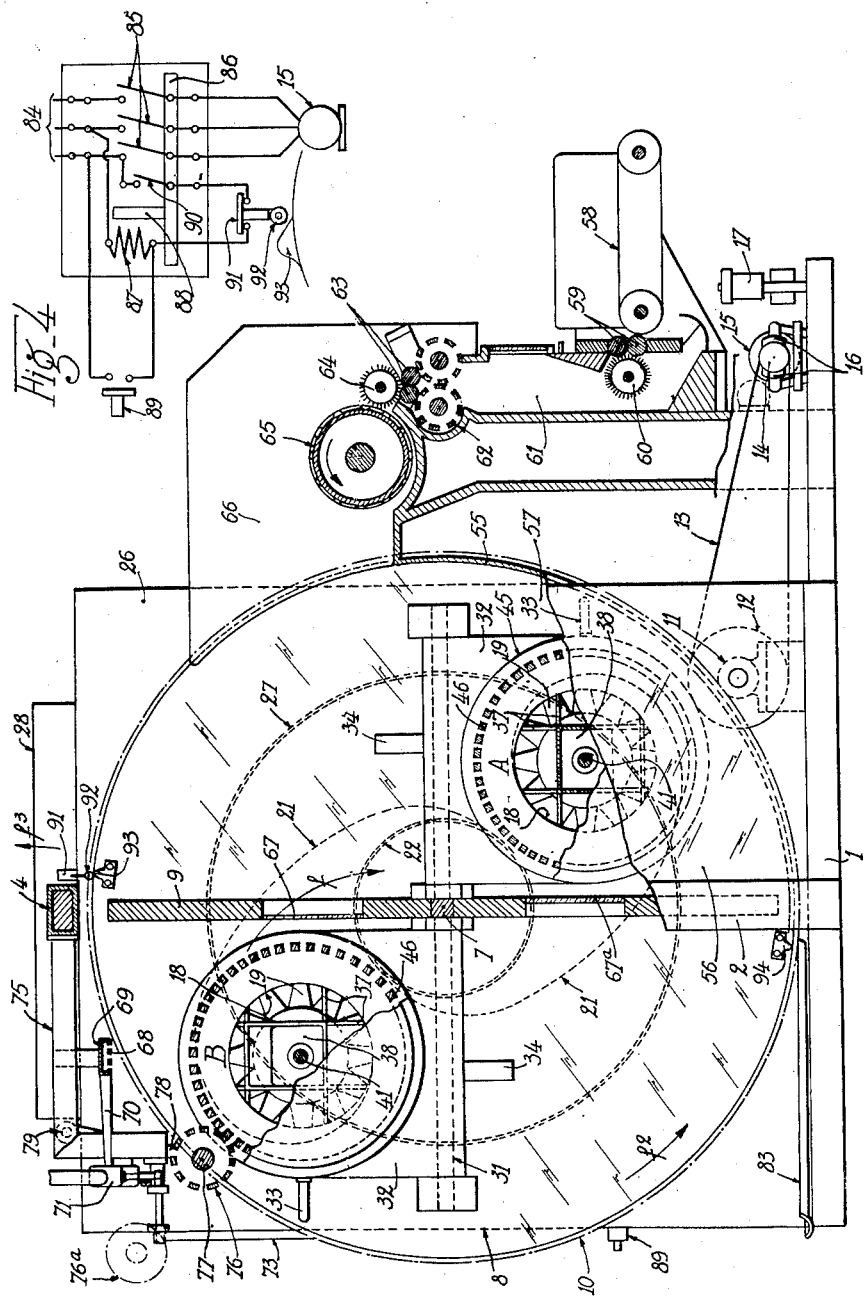
Fig. 1 is an elevational view with portions broken away, of a machine according to the invention.

According to the embodiment shown, the machine comprises (Figs. 1 and 2) a framework which is essentially formed by a horizontal base 1 and a vertical rectangular frame formed by two uprights 2 and 3 and an upper horizontal cross-piece 4. The two uprights 2 and 3 support by means of two anti-friction bearings 5 and 6 (Fig. 2) a horizontal shaft 7 whose axis is XX.

On said shaft 7 are fixed a circular vertical plate 8 and a diametrical partition 9 at right angles to said plate. This assembly is rotary. The plate 8 is provided at its periphery with teeth 10 which mesh with a pinion 11 (Fig. 1). Said pinion is driven by a pulley 12, a belt 13 and a pulley 14 fast on the shaft of an electric motor 15. A brake comprising for example two jaws 16 holds all this transmission stationary as soon as the current supplying the motor 15 is switched off. An electro-magnet 17 releases the brake 16 when the current is switched on to the motor 15. The supply of the motor and the control of this supply are such that the plate 8 is intermittently rotated always in the same direction and each time half a revolution.

This result is obtained for example by means of the circuit shown in Fig. 4. The starting and stopping of the motor 15 are effected by means of a control box of known type, the diagram of which is shown in Fig. 4. It is assumed that the electric current is three-phase current and is supplied by three wires 84. Three contactor blades 85 are fixed on a rocking shaft 86 which is normally in the position of the figure, i. e. the three poles of the contactor 85 are open; consequently, the motor 15 is stopped. An electromagnet 87 is adapted to attract an armature 88 secured to the shaft 86 and cause the contactors 85 to close, whereby current is supplied to the motor 15.

A push-button 89 (Figs. 1 and 4) enables current obtained from two of the line wires 84 to be supplied to the electromagnet 87 and therefore the motor 15 to be started. Said push-button is located on the front of the machine within reach of the operator's hand.

An auxiliary contactor 90 enables the electromagnet 87 to remain energized when the operator's hand no longer exerts pressure on the push-button 89. A contact 91 in series with the contactor 90 and the coil 87 enables this energizing current to be cut off and the motor 15 to be stopped. Said contact 91 is controlled by a roller 92 which is lifted by one or other of two cams 93, 94 fixed to the plate 8. The position of said cams 93, 94 is such that the stoppages occur automatically when the partition 9 is vertical.

The plate 8 is provided with two diametrically opposite circular openings 18. In each of said openings rotates a helical fan wheel 19 fixed on the shaft of a motor 20. These two motors are in turn fixed to the plate 8. On its rear face, the plate supports two chests forming spiral diffusion chambers 21 (Fig. 2) for the helical fans 19. These two spiral chambers 21 are connected at 22 to a large central tube 23 supported by the circular plate 8. Said tube 23 rotates in a circular flange 24 bordering an opening provided in a large rectangular box 26. In said box is fixed a perforated cylinder 27 intended to collect the fur fibres that accidentally pass through the fans 19. The box 26 is provided with a chimney 28 for the exhaust of the air delivered by the fans 19 and after it has passed through the spiral chambers 21, the tube 23 and the cylinder 27. The box 26 is furthermore provided with a door 28 which gives access to the inside thereof and enables the fur which has collected therein to be removed. The electric current is supplied to the motors 20 of the fans 19 by cables 29 which receive the electric current by means of rotary rings 30.

On the front of the circular plate 8 are arranged parallel to said plate two shafts 31 about each of which is pivoted a flat member 32.

Figure 2:
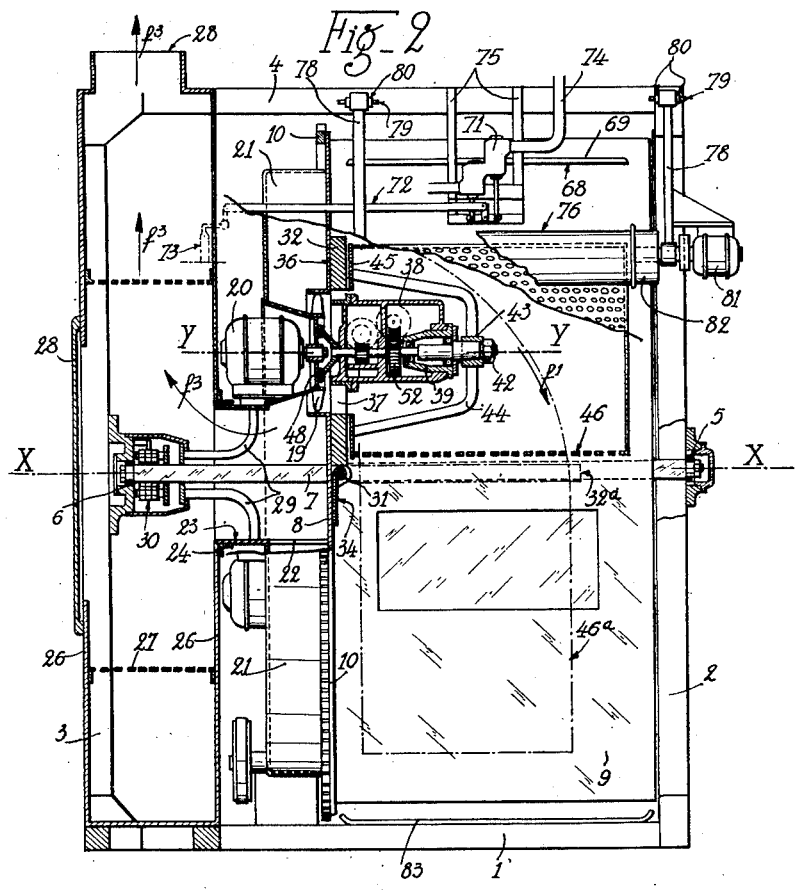
Fig. 2 is a corresponding side view thereof with portions broken away.

A handle 33 fixed in the member 32 enables the operator to pivot said member about the shaft 31 and move it into the position 32ᵃ shown in dot-and-dash lines in Fig. 2. A spring 34 partly balances the weight of the member 32 and of the members hereinafter described which it supports, in such a manner that the whole arrangement is held in the position of Figs. 1 and 2 by the action of said spring, but the same is insufficient to cause the member 32 to leave the position 32ᵃ when it has been moved into it by a manual action on the handle 33, this being obtained by the fact that the lever arm through which the weight of the movable system acts has at that time reached its maximum length.

Figure 3:
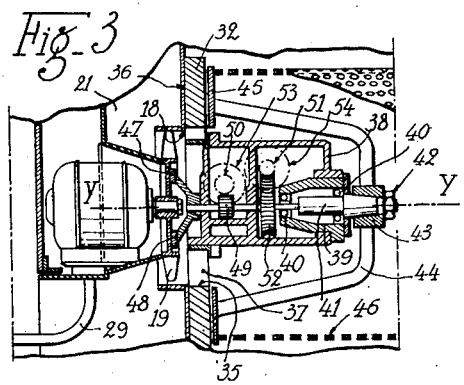
Fig. 3 is a partial view in longitudinal vertical section of one of the perforated formers, its support and its driving mechanism.

Each member 32 is provided with a circular opening 35 (Fig. 3) of the same diameter as and registering with one of the openings 18 of the plate 8 when said member 32 is in the raised position shown, such that its face 36 is thus pressed against the vertical face of said plate 8.

In the opening 35, the member 32 is provided with arms 37 which support a box 38. On the end of said box located on the opposite side to the member 32 is fixed a bearing 39 in which is journalled, by means of anti-friction means 40, a shaft 41, the axis YY of which is horizontal when the member 32 is vertically pressed by the spring 34 against the plate 8. At the end of the shaft 41 a nut 42 locks a hub 43 provided with arms 44 to which is fixed a circular plate 45. On the front face of the plate 45 is fixed by welding or otherwise a perforated former 46 (a cylinder as shown or a cone) on which the hood forms.

A rotary movement is imparted to the shaft 41 and therefore to the plate 45 and to the former 46, by means of a disc 47 which forms the hub of the fan 19 and which is continuously driven by the motor 20. Against said disc 47 is adapted to bear, when the member 32 is raised against the plate 8, a clutch ring 48. Said ring is connected to the shaft 41 by means of a double reducing gear comprising a worm 49 fixed on the same shaft as the ring 48 and meshing with a wheel 50, and a worm 51 meshing in turn with a wheel 52 secured to the shaft 41. Between the wheel 50 and the worm 51 the movement is transmitted by pinions 53 and 54.

It can be seen that in the positions of Fig. 2, each ring 48 is coaxial to the corresponding motor 20 and bears against the disc 47 forming the hub of the helical fan. The quick rotary movement of the motor 20 therefore produces, by means of the transmission which has just been described, a slow rotation of the perforated former 46. On the other hand, when the member 32 is rocked about the shaft 31 in the direction of the arrow $f^1$ (Fig. 2) and moves into the position 32ᵃ, the ring 48 moves away from the disc 47 and the rotation of the corresponding perforated former stops.

Owing to the intermittent rotations, each of half a revolution, of the plate 8 in the direction for example of the arrow $f^2$ (Fig. 1), the two above described devices are successively brought either to A into a position for forming the hood, or to B into a position for spraying, planking (hardening) and removing the hood.

Around the hood-forming position A a wall 55 (Fig. 1) having the shape of a portion of a cylinder which is concentric to the axis of rotation of the support 9 and a stationary vertical wall 56 which is joined on the one hand to the arcuate wall 55 and on the other hand to the vertical post 2 form, with the partition 9 and a portion of the wall of the circular plate 8, a forming tank or chamber 57 into which the fur is projected by a known mechanism called "forming machine input system." This mechanism comprises a band 58 on which the quantity of fur required for making a muff or a hat is placed by an operator. Two feed rollers 59 are provided which carry the fur towards a first picking and combing device 60 (cylinder provided with numerous spikes) which in turn project it into a passage 61. At the upper part of said passage are arranged two perforated cylinders 62 for collecting the fur and conveying it between two feed rollers 63. A second picker 64 fed by said rollers combs and projects the fur against a brush 65 which produces a horizontal current of air in a passage 66 which is connected to the walls of the chamber 57.

The width of the pickers 60 and 64, of the brush 65, of the passage 66 and in general of the whole input mechanism which has just been described is substantially equal to the height of the perforated formers 46.

The partition 9 which is rotarily driven by the circular plate 8 is provided with two glazed openings 67 and 67ᵃ (see Fig. 1) which in turn enable the operator to see how the forming operation is progressing in the tank 57.

The machine furthermore comprises means for supplying water in the form of a spray above the perforated former which is located at the hardening and removing station. A finely perforated plate 68 forms the bottom of a box 69, the inside of which is connected through a flat tube 70 to a valve box 71 which enables the operator, by means of rods 72 and 73, to supply hot water from a pipe 74 to the box 71. The whole arrangement is supported by arms 75 fixed to the cross-piece 4 of the framework.

The hardening device at the station B comprises a cylinder 76, the surface of which is covered with a rough material, for example woollen or cotton cloth, or a finely perforated stainless steel sheet. The spindle 77 of the cylinder is supported by two arms 78 oscillatably mounted about horizontal pivots 79 mounted in jaws 80 fixed to the cross-piece 4 of the framework. By rocking said arms, the cylinder 76 can be made to press by one of its generators against a generator of the perforated cylinder 46 (in the case of a conical perforated former, the cylinder 76 would obviously be replaced by a cone, the apex of which would coincide with the apex of the perforated conical former). The cylinder 76 is given on the one hand a rotary movement about its spindle 77 at such a speed that it rolls without sliding on the perforated former 46, and on the other hand is given a double axial and circumferential vibratory movement at a quick frequency and of very small amplitude, in the known manner, i. e. the cylinder 76 effects along its spindle 77 small reciprocating movements and it simultaneously effects, while rotating about the said spindle, a continuous movement of small circumferential oscillations at the same frequency. These vibrations are produced by a motor 81 (Fig. 2) and by a known mechanism contained in the case 82.

The system comprising the cylinder 76 and its mechanism can be retracted into the position 76ª (Fig. 1) by rocking it about the journals 79. The cylinder 76 may be heated by means of a radiator not shown.

Finally, a horizontal plate 83 (Fig. 1) is fixed to the framework 1 below the station B.

The machine operates as follows:

The circular plate 8 having been stopped in such a position that the partition 9 is vertical, a predetermined weight of fur is placed on the band 58. As has been explained this finely divided fur fiber is projected into the chamber 57. It is sucked on to the perforated former 46 located at A, by the action of the combined fan 19. Said perforated former 46 rotates slowly about its axis, but nevertheless effects about ten revolutions during the forming operation. It is thus evenly coated with fur over its entire surface, since the fur is supplied in a sheet which is substantially the length of a generator of the perforated former. The air sucked in is exhausted through the chimney 28 in the direction of the arrows $f^3$.

When all the fur has passed, which can be seen through the opening 67ª, the operator switches on the current for the motor 15. Said motor rotates the plate 8 half a revolution and then automatically stops; the perforated former coated with fur fibers which are retained by the powerful suction of the fan 19, leaves the position A and assumes the position B, while the perforated former which was in the position B assumes in turn the position A. The operator then effects three successive operations; first spraying, by acting on the rods 72 and 73 he causes hot water to be supplied to the sprayer 68, 69, then, by moving the cylinder 76 downwards, he causes it to come into contact with the hood supported by the perforated former 46. The vibration of the rough surface of said cylinder 76 produces a beginning of felting, or hardening. Finally, the operator stops the spraying, lifts the cylinder 76 and, by acting on the lever 33, causes the member 32 to pivot about the shaft 31 into the position 32a. As the ring 43 is no longer in contact with the disc 47, the rotation of the perforated former stops and the suction of the fan 19 no longer acts inside said former. Said former being in a vertical position, the operator causes the hood to drop off by disengaging the upper edge, in the usual manner. Said hood is received on the plate 83 placed on the framework 1 (or on any other suitable device, conveyor, etc.).

During this time, the perforated cylinder 46, which has moved into the position A, has in turn become coated with fur fibers. The operator moves at B the former from its vertical position to the horizontal position; he causes a further half-revolution of the plate 8 to be effected, and the cycle begins again.

Naturally, the invention is in no way limited to the embodiment illustrated and described which has only been chosen by way of example.

Having now described my invention what I claim as new and desire to secure by Letters Patent is:

1. In a forming machine for the manufacture of felt hoods, a base, a vertical frame forming a framework fixed on said base, a horizontal shaft rotatably mounted on said frame, a rotary vertical support fixed on said shaft, an electric motor fixed on said base, transmission means connecting said motor to said support and shaft for rotating them, an electric mechanical device for controlling the supply of said motor, a manually actuated control contact and an auxiliary control contact both secured on said frame for actuating said device in order respectively to start and to stop said motor, two members secured on said rotary support for actuating said auxiliary control contact so that said support is driven only a fraction of a revolution after said manually actuated control contact has been actuated, said two members being angularly so spaced on said rotary support that said latter stops alternatively in the one and in the other of two angular stop positions, at least one horizontal spindle rotatably mounted on said support and which is rotatable parallel to the shaft of said support but in an eccentric position relatively thereto, a perforated former fixed on said spindle, means mounted on said support for rotating said spindle and said former, a forming tank supported by said base, means fixed to said base for supplying said tank with fur and a device supported by said framework for spraying the hood formed, said forming tank and said spraying device being so disposed with respect to both said angular stop positions of said rotary support that said perforated former is located alternately inside of said tank for one of said stop positions and below said spraying device for the other of said stop positions.

2. Forming machine according to claim 1, further comprising at least one intermediate member which supports said spindle on which said perforated former is fixed and which is oscillatably mounted on said rotary vertical support between a normal vertical forming and spraying position in which said spindle is horizontal and a horizontal position in which said spindle is vertical for the removal of the hood formed.

3. Forming machine according to claim 1, wherein said two members for actuating said auxiliary control contact are secured on said rotary vertical support in two diametrically opposite positions relatively to the shaft of said support, so that the two stop positions of said support are also diametrically opposite, said support carrying two oscillating intermediate diametrically opposite members, each of which supports a perforated former, said forming tank and said spraying device also being opposite one another relatively to said shaft and so located on said frame that when one of the formers is in said tank, the other is under the spraying device and conversely.

4. In a forming machine for the manufacture of felt hoods, a base, a vertical frame forming a framework fixed on said base, a horizontal shaft rotatably mounted on said frame, a rotary vertical support fixed on said shaft, an electric motor fixed on said base, transmission means connecting said motor to said support and shaft for rotating them, an electric mechanical device for controlling the supply of said motor, a manually actuated control contact and an auxiliary control contact both secured on said frame for actuating said device in order respectively to start and to stop said motor, two members secured on said rotary support for actuating said auxiliary control contact so that said support is driven only a fraction of a revolution after said manually actuated control contact has been actuated, said two members being angularly so spaced on said rotary support that said latter stops alternatively in the one and in the other of two angular stop positions, at least one intermediate member oscillatably mounted on said rotary vertical support, a horizontal spindle rotatably mounted on said intermediate member in an eccentric position relatively to said shaft, a perforated former fixed on said spindle and movable by oscillation of said intermediate member on said rotary vertical support between a normal forming and spraying position in which said spindle is horizontal and a position in which said spindle is vertical for the removal of the hood formed, means mounted on said support for rotating said spindle and said former, a forming tank supported by said base, means fixed to said base for supplying said tank with fur and a device supported by said framework for spraying the hood formed, said forming tank and said spraying device being so disposed with respect to both said angular stop positions of said rotary support that said perforated former is located alternately inside of said tank for one of said stop positions and below said spraying device for the other of said stop positions.

5. In a forming machine according to claim 1 wherein said rotary vertical support is provided with an opening opposite said perforated former, said forming machine further comprising an auxiliary support fixed on said vertical support on the opposite face thereof to said former, a motor supported by said auxiliary support, a suction fan driven by said motor and sucking through said opening and said perforated former, and a compartment fixed to said framework and into which said fan delivers.

6. In a forming machine according to claim 5 wherein said spindle is supported by an intermediate member oscillatably mounted on said rotary vertical support and further comprising a clutch for driving said spindle on which said perforated former is fixed, the driving element of said clutch being formed by a portion of said fan, whereas the driven element is supported by said spindle so that the disengagement is automatically effected by rocking the said intermediate member supporting said spindle.

7. A forming machine according to claim 6 wherein said compartment is provided with a perforated wall intended to retain the fur fibres carried along by the air sucked in, a chimney for exhausting the filtered air and a door for removing the fur fibres retained.

8. A forming machine according to claim 3 wherein the rotary vertical support carries in a diametrical plane a partition at right angles to said support and the forming tank is formed by the combination of said support and said partition, which form two adjacent sides thereof, with a stationary vertical wall which forms a third side parallel to the support and with a likewise stationary wall formed by a portion of a cylinder which is concentric to the axis of rotation of the support and forms the bottom and fourth side, both said stationary walls being fixed to said base and to said frame forming a framework.

9. A forming machine according to claim 8 wherein said partition is provided with two glazed openings which in turn enable the progress of the forming operation to be checked visually.

MARCEL CASSÉ.

REFERENCES CITED

The following references are of record in the file of this patent:

UNITED STATES PATENTS

| Number | Name | Date |
|---|---|---|
| Re. 1,030 | Taylor | Aug. 21, 1860 |
| 2,172,342 | Birdsall | Sept. 12, 1939 |
| 2,474,971 | Cassé | July 5, 1949 |